(12) United States Patent
Nakamura et al.

(10) Patent No.: US 6,751,733 B1
(45) Date of Patent: Jun. 15, 2004

(54) REMOTE AUTHENTICATION SYSTEM

(75) Inventors: Hiroshi Nakamura, Tokyo (JP);
Teruko Fujii, Tokyo (JP); Tetsuo Sadakane, Tokyo (JP); Yoshimasa Baba, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/335,056

(22) Filed: Jun. 16, 1999

(30) Foreign Application Priority Data

Sep. 11, 1998  (JP) .......................................... 10-257813

(51) Int. Cl.[7] ............................................... H04L 9/32
(52) U.S. Cl. ....................... 713/182; 713/186; 713/155; 386/282; 386/285
(58) Field of Search ................................. 713/186, 182, 713/155; 380/282, 285

(56) References Cited

U.S. PATENT DOCUMENTS

| | | | | |
|---|---|---|---|---|
| 5,534,855 A | * | 7/1996 | Shockley et al. | 340/5.52 |
| 5,978,495 A | * | 11/1999 | Thomopoulos et al. | 382/116 |
| 6,035,402 A | * | 3/2000 | Vaeth et al. | 713/201 |

FOREIGN PATENT DOCUMENTS

| | | | | |
|---|---|---|---|---|
| GB | WO 09746978 A1 | * | 12/1997 | ............ G07C/9/00 |
| JP | 225925 | | 1/1990 | |

* cited by examiner

Primary Examiner—Gilberto Barrón
Assistant Examiner—Benjamin E Lanier
(74) Attorney, Agent, or Firm—Birch, Stewart, Kolasch & Birch, LLP

(57) ABSTRACT

To obtain a remote authentication system that securely authenticates with protecting biometrics information, which is user's personal information, and is firm on security when performing authentication of a person with the biometrics information, and a remote authentication method. The present invention encrypts biometrics information that is user's personal information, and transfers the biometrics information over a network in such a state that only an authentication server, which the user assigns, can decode the biometrics information. Therefore, it is possible to securely protect user's privacy that is the biometrics information in a style of reflecting user's intention, and to prevent reuse of invalid authentication information since it is possible to confirm the date and time, when the authentication information was generated, by the authentication server. Furthermore, it is possible to keep the security of a system firm since an authenticated side can confirm whether the user is authenticated.

20 Claims, 7 Drawing Sheets

REMOTE AUTHENTICATION SYSTEM

BACKGROUND OF THE INVENTION

1. Field of the Invention

The present invention relates to a remote authentication system identifying a person with biometrics.

2. Description of the Related Art

Heretofore, so as to perform security protection in an information processing system connected to a network, it is necessary to identify a person and to judge approval or disapproval of access of the person, that is, to perform authentication. In addition, in cash dispensers of banks and the like, authentication for identifying a person and accessing the person's transaction information, and authentication for entrance into and exit from confidential research sites, membership clubs, and the like, which have high confidentiality, are performed.

Identification of a person and authorization of the person's qualification, that is, authentication is performed with a magnetic card, an IC card, which are positioned similarly to an identification card and the like, and the person's memory such as a password, and combination of them. There are problems that the authentication cannot be performed because the password is forgotten, and the magnetic card and IC card are lost or broken, and another person, who is not the principal, is authenticated with masquerading by burglary and leakage of password information.

In addition, as one of means for authenticating a user over a network, there is a digital signature for indirectly authenticating the user by authenticating a message created by the user. In the digital signature, first, a message sender attaches a cryptogram that is encrypted from a message digest, into which an original message is compressed, with the sender's cryptographic key to the message. A message receiver confirms that the message is one, which the sender himself/herself sent, and that the message is not tampered, by creating a message digest from the message received, decoding the message digest from the cryptogram, which is attached, with the sender's decoding key, and confirming coincidence of these two message digests.

In addition, in the above-described encryption method, there are a common key encryption method, using the same key for a cryptographic key and a decoding key, and a public key encryption method using different keys for the cryptographic key and decoding key. In the public key encryption method, when one key is set as a secret key and is kept safely and another key is officially announced as a public key, the cryptogram encrypted with the public key cannot be decoded into the original message if a receiver has not the secret key, and hence the sender can transfer the message in such a form that only the receiver, who is desired by the sender, can decode, and the cryptogram encrypted with the secret key can be decoded with the public key into the original message, and hence the receiver can authenticates that the message is one from the sender herself/himself having the secret key.

Heretofore, although, in RFC1421 and RFC1422 (PEM: Privacy Enhancement for Internet Electronic Mail) that are registered in RFC (Request For Comment) of IETF (Internet Engineering Task Force), the digital signature and message encryption are performed with the public key encryption method and common key encryption method, there is a problem that it is necessary to administrate the secret key on the sender's hands since the sender uses the own secret key, for example, to safely keep the secret key with saving the secret key in a floppy disk, a magnetic card, and an IC card.

On the other hand, in the authentication with biometrics information, which is a person's biological characteristic such as finger print information, palm print information, handwriting information, and retina information, it is difficult to perform masquerade and is unnecessary to administrate the information of the secret key so long as the user himself/herself presents, and it is possible to resolve the complexness of keeping a baggage and the threat of loss at the time of the authentication of a person and the complexness of memory at the time of the authentication of a password with the magnetic card and IC card. Nevertheless, there are problems that, if the authentication with the biometrics information is necessary in a wide range, the equipment for performing the centralized administration and authentication of the biometrics information is necessary, and that it is necessary to keep security with concealing the user's biometrics information at the time of transferring the biometrics information to the equipment, performing the authentication, from the viewpoint of protection of privacy.

Furthermore, in general, random numbers are for creating a cryptographic key in a system creating the cryptographic key used for concealing the biometrics information. Nevertheless, there is also a problem that it is important to eliminate the tendency of the random numbers so as to make it difficult to break the cryptographic key.

In addition, an apparatus acquiring biometrics should be properly administrated from the viewpoint of protection of users' privacy, and it is necessary to authenticate an administrator. Nevertheless, there is a problem that, since another person cannot act for the administrator if the authentication of this administrator was performed with biometrics, another person can never perform the access to the biometrics acquisition apparatus including initialization. Furthermore, there is a problem that even a valid administrator can never perform the access to the biometrics acquisition apparatus including initialization if the biometrics used for the authentication is largely changed or lost by suffering damage in an accident in case of the valid administrator.

Moreover, in general, a system performing user authentication is required to find an invalid authentication, for example, as for a cash card in a bank, there is means for making a cash card unusable if authentication with a preset number of times of password inputs is unsuccessful. Also, a user authentication system with the biometrics is required to find an invalid authentication. Nevertheless, a condition of biometrics is different for every person, for example, in a system authenticating a person with finger print matching, a minimum matching rate identifying a person as the principal is determined, but a person whose finger is rough or worn gets a low matching rate even if the person can obtain the best biometrics information at the time, and a failure probability of the authentication itself increases if the matching rate decreases due to minor failure such as insufficient contact at the time of acquiring the finger print. Therefore, there is a problem that it cannot be equally performed for all the persons that it is judged to be an unsuccessful authentication within only the preset number of times.

SUMMARY OF THE INVENTION

The present invention is provided to solve the above problems. An object of the present invention is to provide a remote authentication system which securely authenticates by utilizing biometrics information, which is the user's personal information, and is firm on security when performing authentication of a person with the biometrics information, and a remote authentication method.

In a remote authentication system, in which an authentication server, an application server, and a user terminal are connected to a network respectively, and which authenticates a user using the user terminal, a remote authentication system according to a first invention is a system, wherein the authentication server has a pair of a public key and a secret key in a public key encryption method, announces the public key, and conceals the secret key; wherein at least one kind or a plural kind of biometrics acquisition apparatus is connected to the user terminal; wherein the biometrics acquisition apparatus: encrypts user's biometrics information, acquired at the time of authentication, with a common key in a common key encryption method; acquires date and time information, creates a message digest with connecting the date and time information with the common key, and further encrypts the message digest with the common key; acquires the public key of the authentication server, which the user assigns, and encrypts the common key with the public key of the authentication server; and transfers the biometrics information encrypted, the common key and date and time information, which is encrypted, and the message digest encrypted with connecting the date and time information with the common key, as authentication information to the user terminal; and wherein the user terminal and application server transfer the authentication information to the authentication server, and the authentication server: decodes user's biometrics information with the common key acquired by decoding the authentication information, which is transferred, with the secret key; authenticates the user with the biometrics information; and encrypts result of authentication and a message digest of the result of the authentication with the secret key and transfers both to the application server.

In addition, in a remote authentication system, in which an authentication server and a user terminal are connected to a network respectively, and which authenticates a user using the user terminal, a remote authentication system according to a second invention is a system, wherein the authentication server has a pair of a public key and a secret key in a public key encryption method, announces the public key, and conceals the secret key; wherein at least one kind or a plural kind of biometrics acquisition apparatus is connected to the user terminal; wherein the biometrics acquisition apparatus: encrypts user's biometrics information, acquired at the time of authentication, with a common key in a common key encryption method; acquires date and time information, creates a message digest with connecting the date and time information with the common key, further encrypts the message digest with the common key; acquires the public key of the authentication server, which the user assigns, and encrypts the common key with the public key of the authentication server; and transfers the biometrics information encrypted, the common key and date and time information, which is encrypted, and the message digest encrypted with connecting the date and time information with the common key, as authentication information to the user terminal; wherein the user terminal transfers the authentication information to the authentication server; and wherein the authentication server: decodes user's biometrics information with the common key acquired by decoding the authentication information, which is transferred, with the secret key; authenticates the user with the biometrics information; and encrypts result of authentication and a message digest of the result of the authentication and transfers both to the user terminal.

In addition, a remote authentication system is a system, wherein a biometrics acquisition apparatus: transfers biometrics information to a user terminal without encrypting the biometrics information at the time of authentication; encrypts the user's biometrics information, which the user terminal obtains, with a common key in a common key encryption method; acquires date and time information, creates a message digest with connecting the date and time information with the common key, encrypts the message digest with the common key; acquires a public key of an authentication server, which the user assigns; encrypts the common key with the public key of the authentication server; and transfers the biometrics information encrypted, the common key and date and time information, which is encrypted, and the message digest encrypted with connecting the date and time information with the common key, as authentication information.

Furthermore, a remote authentication system according to a fourth invention uses biometrics information as a part or all of random numbers for creating a common key in a common key encryption method for encrypting the user's biometrics information acquired, at the time of authentication.

A remote authentication system according to a fifth invention is a system, wherein a biometrics acquisition apparatus includes: an authentication unit of an administrator administrating the biometrics acquisition apparatus; and an authentication unit of an initializer initializing the biometrics acquisition apparatus, wherein the two authentication units perform authentication separately, and can perform only the initialization with authentication of the initializer.

A remote authentication system according to a sixth invention is a system, wherein an authentication server: saves historic records of matching rates that are results of matching biometrics at the time of user authentication; compares a matching rate with an average matching rate at the time of identifying a user as a principal until the previous occasion if the authentication server does not identify the user as the principal at the time of user authentication; confirms whether the matching rate at this time changes more largely than a preset value determined by an administrator; and informs a contact, who is registered beforehand, if a number of failed times due to changes more largely than the fixed value reaches a fixed value determined by the administrator.

A remote authentication system according to a seventh invention is a system, wherein an authentication server: saves historic records of matching rates that are results of matching biometrics at the time of user authentication; compares a matching rate with a matching rate at the time of identifying a user as a principal until the previous occasion at the time of user authentication if the authentication server identifies the user as the principal; makes the user authentication unsuccessful if the two matching rates are the same rates and a message digest of biometrics information is not saved, performs message digest calculation of biometrics information at this time, saves the message digest of biometrics information with the matching rate; saves a message digest of biometrics information at this time with a matching rate as a pair with calculating the message digest of biometrics information at this time if the two matching rates are the same and a message digest is saved, compares the message digest of biometrics information at this time with the message digest of biometrics information at the same matching rate in the past, identifies the user as a principal if both message digests are different from each other; does not identify the user as a principal if a pair of a matching rate and a message digest at this time completely coincides with a pair of a matching rate and a message digest in the past; and informs a contact, who is registered beforehand, if a number of cases that the pair of the matching rate and message digest at this time completely coincides with the pair of the matching rate and message digest in the past reaches a value equal to or larger than a fixed value which is determined by an administrator.

DESCRIPTION OF THE PREFERRED EMBODIMENTS

Hereinafter, embodiments of the present invention will be described with reference to drawings.

Embodiment 1

Figure 1:
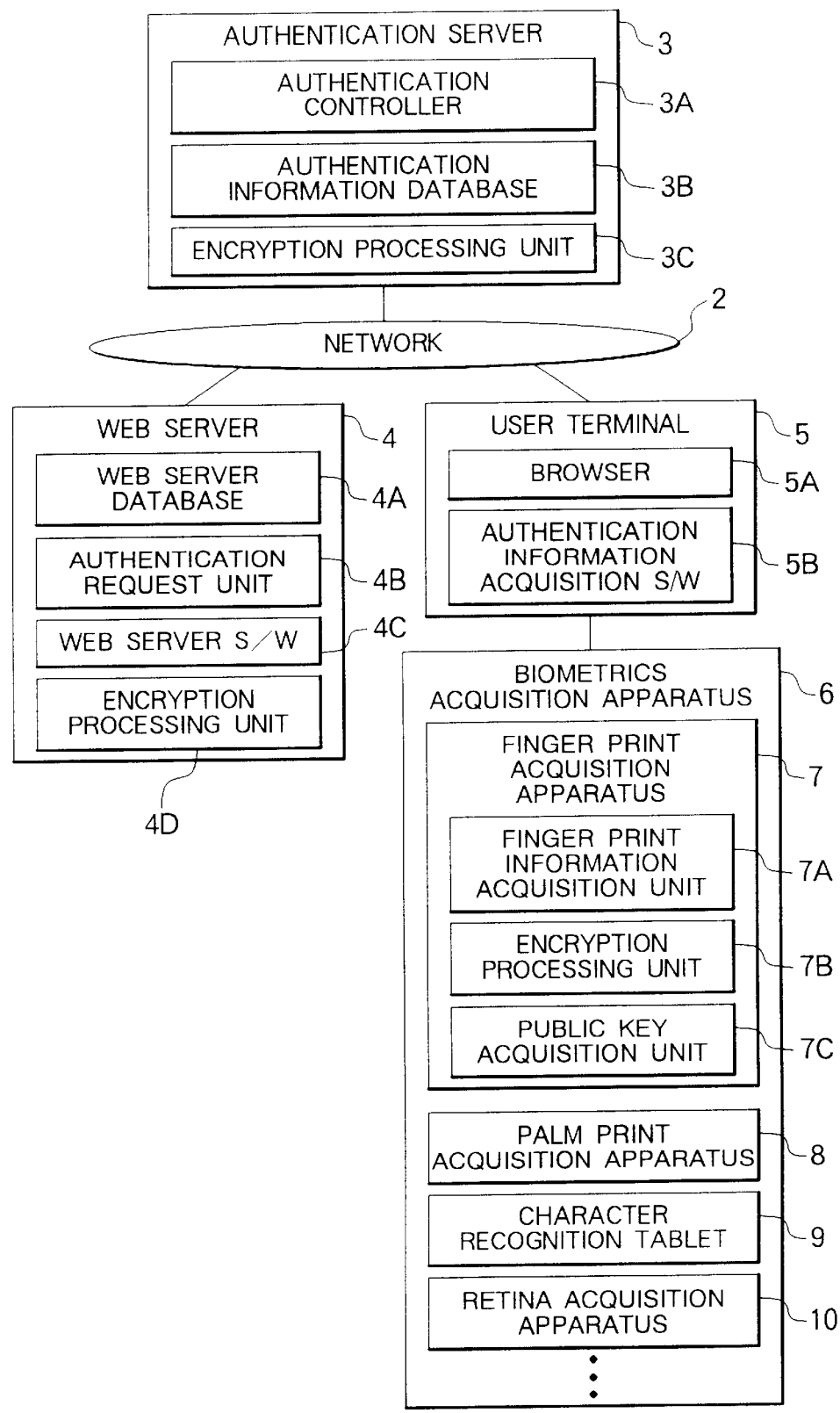
FIG. 1 is a block diagram showing the configuration of a first embodiment of an Web system where a remote authentication system according to the present invention is applied.

FIG. 1 shows the configuration of a Web system 1 where the present invention is applied. Over a network 2, an authentication server 3, an Web server 4 that is an application server, and a user terminal 5 are connected, and a biometrics acquisition apparatus 6 is connected to the user terminal 5. In this Web system 1, if a user accesses the Web server 4 through the user terminal 5, the Web server 4 receives user's personal authentication from the authentication server 3, and according to the result, the Web server 4 performs access control to the user.

The authentication server 3 is a computer system (hereinafter, this is shown as a system having a CPU, memory, a disk, communication control, and the like) such as a personal computer and a workstation that are composed of an authentication controller 3A, an encryption processing unit 3C, and an authentication information database 3B, and announces one key in a public key method as a public key and conceals another key as a secret key.

In addition, the Web server 4 is a computer system such as a personal computer and a workstation where a Web server database 4A, an encryption processing unit 4D, an authentication request unit 4B, and an application of a Web server software 4C (hereinafter, software is written as S/W) that is an application requiring personal authentication operate.

In addition, the user terminal 5 is a computer system such as a personal computer and a workstation where a browser 5A displaying information of the Web server terminal 4, and authentication information acquisition S/W 5B operate. Furthermore, a biometrics acquisition apparatus 6 is connected to the user terminal 5. The biometrics acquisition apparatus 6 represents a finger print acquisition apparatus 7 and a palm print acquisition apparatus 8 that acquire finger print of a human body and palm print information with image processing as biometrics information, a character recognition tablet 9 acquiring handwriting information, which a user draws, as biometrics information, a retina acquisition apparatus 10 acquiring retina information of a human body as the biometrics information with eyeground (fundus) scanning and the like, and the like.

Here, a case that the finger print acquisition apparatus 7 is used as the biometrics acquisition apparatus 6 will be described as an example. In addition, the biometrics information acquired by the biometrics acquisition apparatus 6 such as the finger print acquisition apparatus 7 can be image data, image data that is not processed such as electrostatic data, and characteristic point data obtained by extracting characteristics from image data. The finger print acquisition apparatus 7 is composed of a finger print information acquisition unit 7A acquiring finger print information with image processing and the like and transferring the finger print information to the user terminal, an encryption processing unit 7B encrypting the finger print information, and a public key acquisition unit 7C acquiring a public key of the authentication server 3.

Next, operation will be described.

Figure 2:
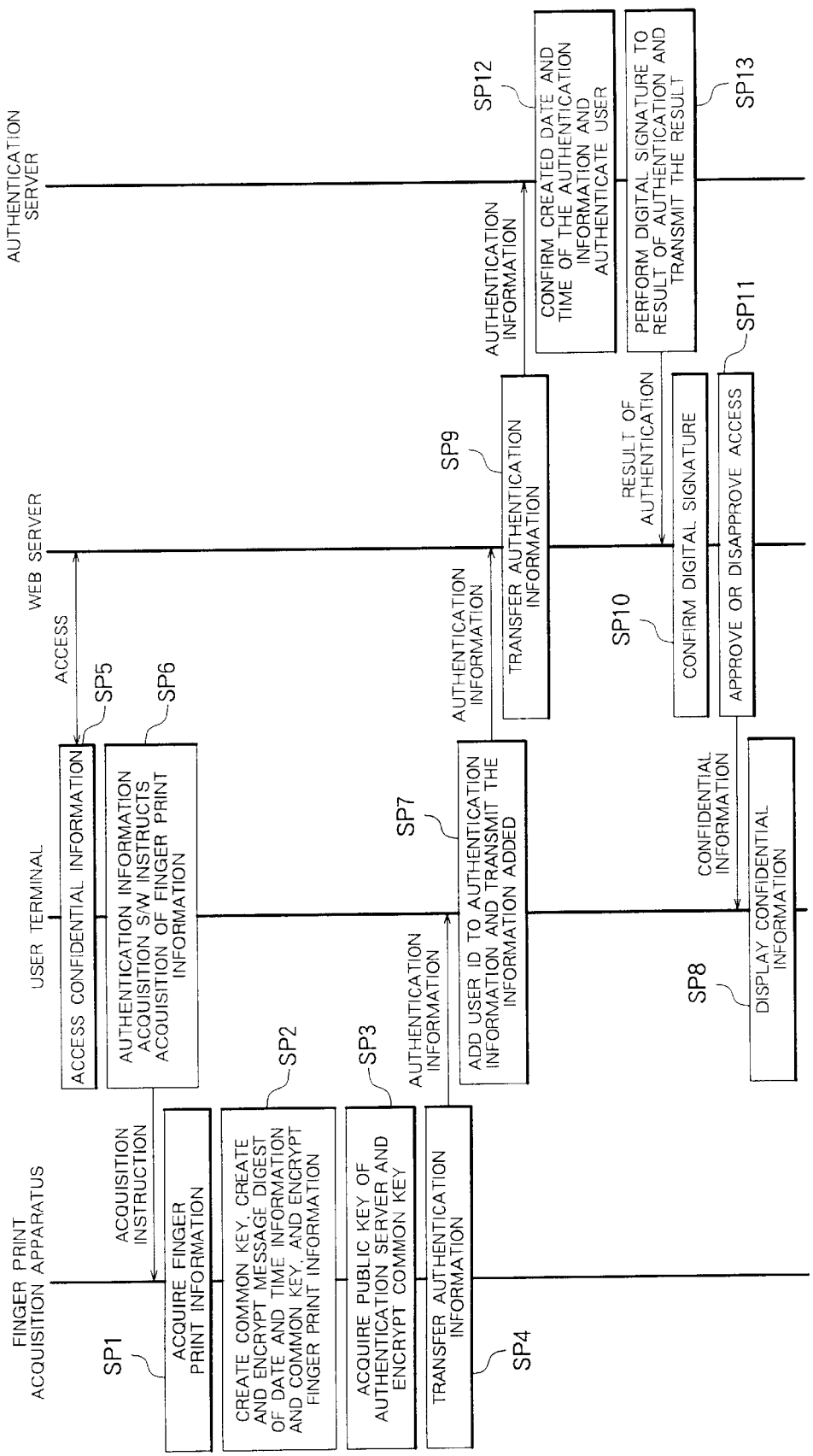
FIG. 2 is a timing chart for explaining the processing of authentication in the Web system in FIG. 1.

A flow of authentication processing in the Web system 1 like this is shown in FIG. 2.

First, a case (SP5) that a user accesses information in the Web server database 4A, which has high confidentiality, in the Web server 4 with the browser 5A that is an application operating in the user terminal 5 will be described. The Web server S/W 4C, which is an application performing access control of the information having high confidentiality, is required to perform the user authentication so as to judge whether the user has an access authority.

The authentication information acquisition S/W 4C in the user terminal 5 acquires the finger print information, which is biometrics information necessary for the authentication, from the finger print acquisition apparatus 7 (SP6). At this time, the S/W 4C may operate with cooperating with other S/W (software such as a driver acquiring the authentication information).

The finger print information acquisition unit 7A in the finger print acquisition apparatus 7, which is instructed to acquire the finger print information by the authentication information acquisition S/W 5B in the user terminal 5, acquires the finger print information from the user (SP1). Although the encryption processing unit 7B encrypts this finger print information since this finger print information is user's inherent personal information, first, the encryption processing unit 7B creates a common key in the common key method for encrypting this finger print information, and encrypts the finger print information with this common key. At the same time, the encryption processing unit 7B acquires date and time information, creates a message digest with connecting the date and time information with the common key, and further encrypts the message digest with the common key (SP2).

The public key acquisition unit 7C in the finger print acquisition apparatus 7 acquires a public key of the authentication server from user's instruction such as a floppy disk, a magnetic card, an IC card, or key entry. Alternatively, if the finger print acquisition apparatus 7 is properly administrated, the public key of the authentication server 3 is fixedly saved in the public key acquisition unit 7C in the finger print acquisition apparatus 7, and hence the user may use the public key after recognizing the public key. Next, the encryption processing unit 7B encrypts the common key with the public key of the authentication server 3 (SP3).

Then, the finger print acquisition unit 7A transfers the finger print information encrypted, the date and time information, the message digest with connecting the date and time information with the common key that is encrypted, and the encrypted common key as the authentication information to the authentication information acquisition S/W 5B in the user terminal 5 (SP4).

The authentication information acquisition S/W 5B in the user terminal 5 transfers the authentication information, which is acquired, to the Web server 4 through the browser 5A. At this time, the browser 5A transfers the authentication information with adding a user ID such as a user name and a mail address, which the browser 5A acquires separately (SP7).

The authentication request unit 4B in the Web server 4 transfers the authentication information, which the authentication request unit 4B acquires through the Web server S/W 4C, to the authentication controller 3A in the authentication server 3 (SP9).

The authentication controller 3A in the authentication server 3 makes the encryption processing unit 3C decode the authentication information transferred, and performs the user authentication. At this time, the encryption processing unit 3C compares the message digest created from the date and time information and common key, which are transferred, in the authentication server 3 with the message digest decoded from the message digest created with connecting the date and time information, which is encrypted, with the common key, and confirms the validity of the date and time, when the authentication information was created, in consideration of transfer delay (SP12).

The authentication controller 3A performs finger print matching from the finger print information and user ID, which are included in the authentication information transferred, and personal information originally saved in the authentication information database 3B in the authentication server 3. The authentication controller 3A creates the result of the authentication showing that the user is valid if the authentication controller 3A identifies the user as the principal in consequence of matching, or judges that the user is not the principal if the authentication controller 3A cannot identify the user as the principal in consequence of the matching, and creates the result of the authentication. This result of the authentication is delivered to the encryption processing unit 3C, and the encryption processing unit 3C creates a message digest of the result of the authentication, encrypts the message digest with the secret key of the authentication server 3, that is, performs digital signature, and delivers this message digest, which is encrypted, to the authentication controller 3A. The authentication controller 3A informs the authentication request unit 4B in the Web server 4 of the result of the authentication with including the message digest, which is encrypted, in the result of the authentication (SP13).

The authentication request unit 4B in the Web server 4 that receiving the result of the authentication informs the encryption processing unit 4D of the result of the authentication. The encryption processing unit 4D decodes the informed message digest, which is encrypted, with the public key of the authentication server 3, and confirms that the message digest is surely the valid message from the authentication server 3 by comparing the decoded message digest with the message digest of the informed result of the authentication (SP10). If the authentication request unit 4B is informed from the encryption processing unit 4D that the encryption processing unit 4D confirmed that the information was the valid information from the authentication server 3, the authentication request unit 4B informs the Web server S/W 4C of the result of the authentication. The Web server S/W 4C judges approval or disapproval of access to the information in the Web server database, which has high confidentiality, to the user according to the result of the authentication (SP11). For example, the Web server S/W 4C performs operation to the user access such as the display of the confidential information.

In this manner, the finger print information that is user's personal information is encrypted with the common key created, the common key is encrypted with the public key of the authentication server 3, which the user set, and the public key of the authentication server 3 is directly set by the user in the finger print acquisition apparatus 7. Hence, there is such an effect that it is possible to securely protect the user's personal privacy, which is the finger print information that is the biometrics information, in a style of reflecting user's intention since the finger print information is transferred over the network in such a condition that only the authentication server 3, which the user assigned, can decode the finger print information. Furthermore, a user can instruct only a public key of the authentication server 3 with a floppy disk, a magnetic card, an IC card, or key entry to the finger print acquisition apparatus 7, there is no problem on security even if the floppy disk, magnetic card, or IC card is lost or stolen, which saves this public key, and the user can receive the personal authentication with a substitute, which saves the same public key or the same article. There is another effect that it is unnecessary to perform processing such as special notification and reissue at the time of loss and burglar and it is possible to lighten the administration load.

In addition, since the data and time, when the authentication information was created, is confirmed in the authentication server 3, it is possible to prevent reuse of the invalid authentication information, and to keep security high since it can be confirmed in the Web server 4 in the authentication-requester's side whether the authentication is performed by the authentication information authentication server 3.

Although the present invention is applied in the Web system 1 in this embodiment, the same effect can be obtained even if the Web server S/W 4C and browser 5A are other applications, constructing another system, such as accounting information administration server S/W and accounting information administration client S/W, and database retrieval server S/W and database retrieval client S/W.

Embodiment 2

Figure 3:
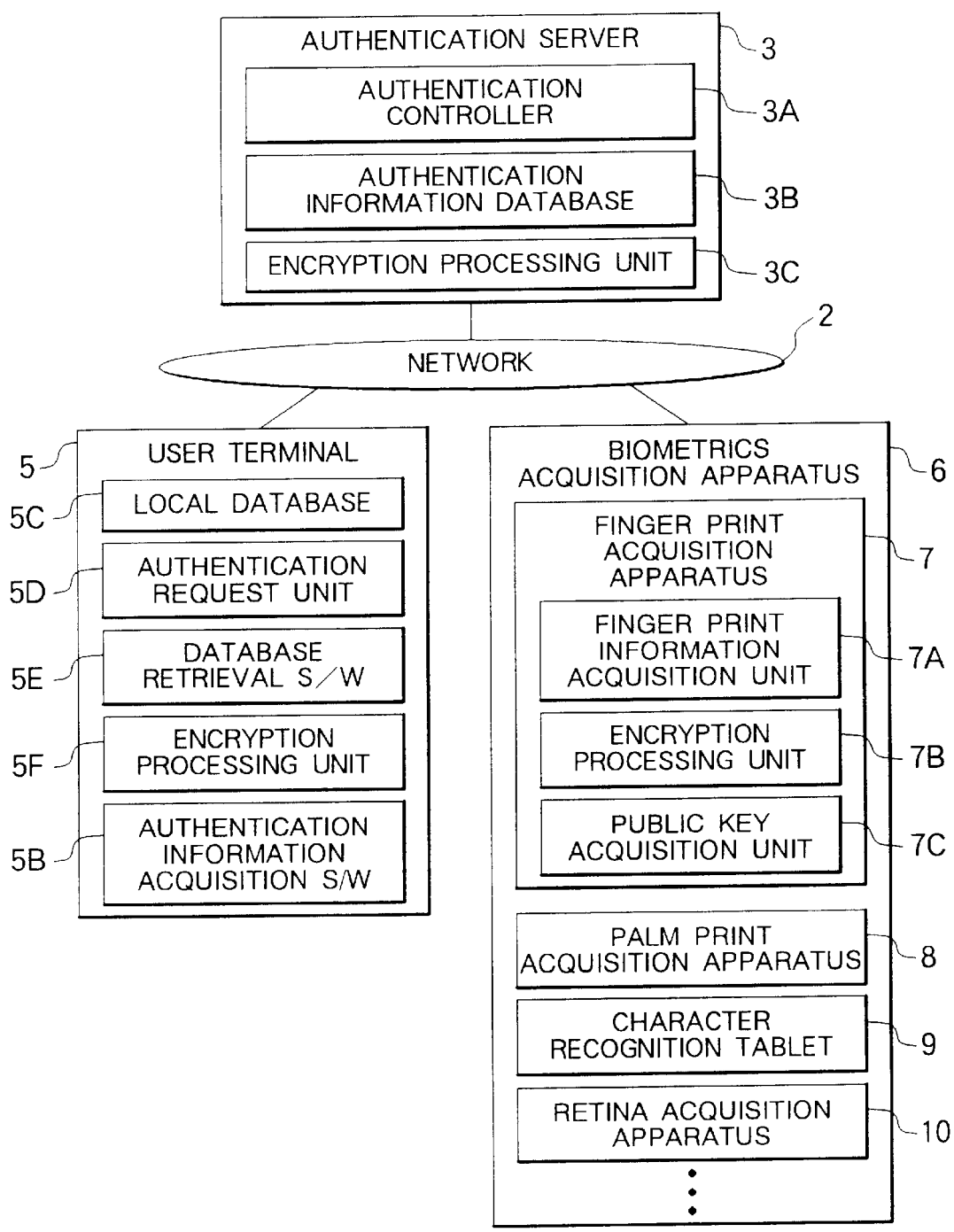
FIG. 3 is a block diagram showing the configuration of a second embodiment of a database retrieval system where a remote authentication system according to the present invention is applied.

This embodiment is obtained by simplifying the first embodiment, and the Web server 4 and user terminal 5 in FIG. 1 become only a user terminals 5 in FIG. 3. Since, in FIG. 3 where the same symbols are assigned to the parts corresponding to the parts in FIG. 1, applications for which the personal authentication is necessary present in only the user terminal 5, the Web server S/W 4C and two applications, constructing the browser 5A, that are shown in FIG. 1 are replaced to database retrieval S/W 5E, and the Web server database 4A is replaced to a local database 5C. In this case, the authentication request unit 4B and encryption processing unit 4D that construct the Web server 4 in FIG. 1 become a component of the user terminal 5 in FIG. 3.

In the second embodiment, the user terminal 5 is a computer system such as a personal computer and a workstation, where the local database 5C, an encryption processing unit 5F, a authentication request unit 5D, a database retrieval S/W 5E that is an application for which the personal authentication is required, and authentication information acquisition S/W 5B operate. In addition, a biometrics acquisition apparatus 6 is connected to the user terminal 5, and has the same configuration as that in the first embodiment. Furthermore, the authentication server 3 also has the same configuration as that in the first embodiment described above.

Here, a case that a finger print acquisition apparatus 7 is used as the biometrics acquisition apparatus 6 will be exemplified.

Next, operation will be described.

Figure 4:
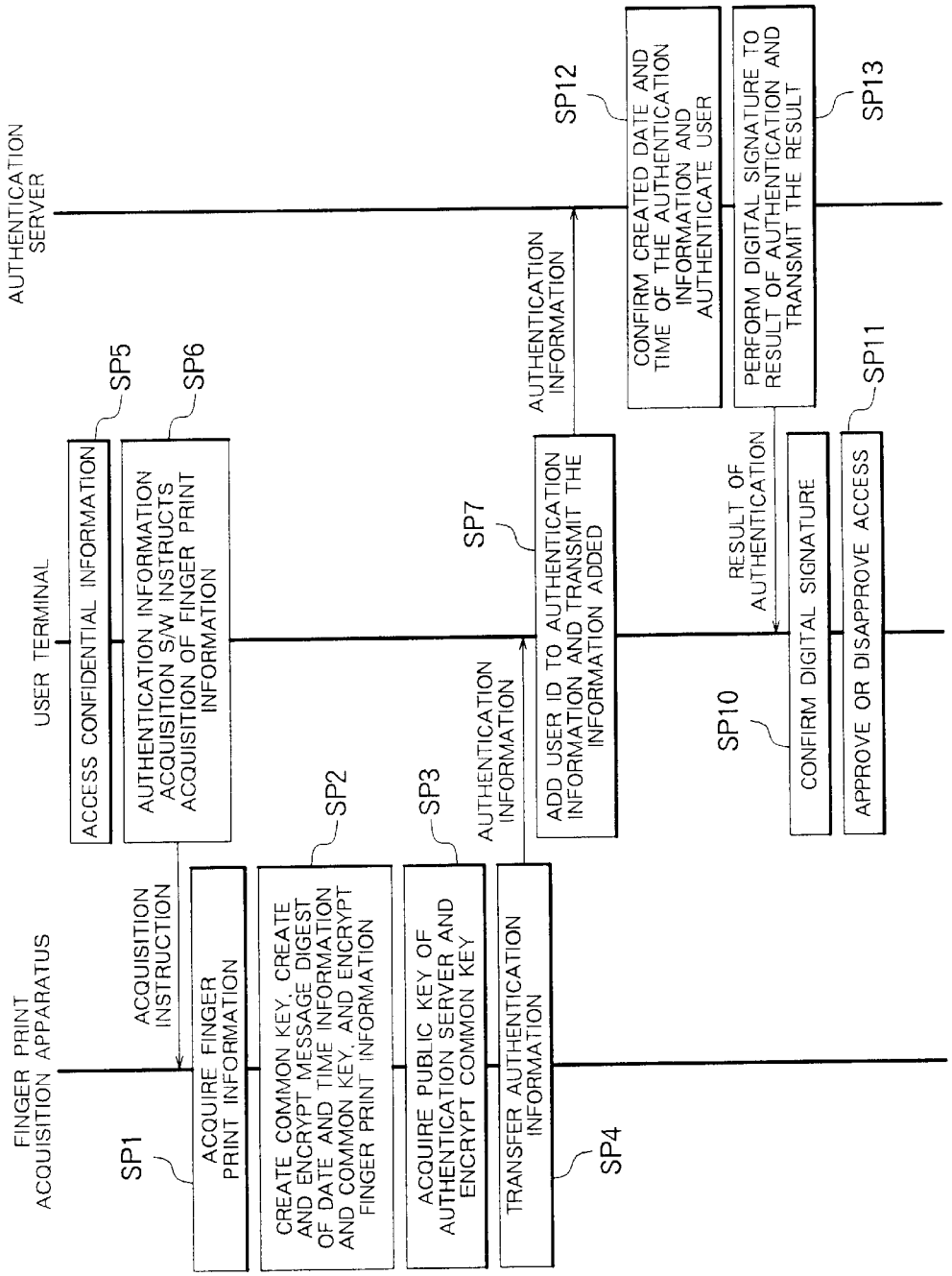
FIG. 4 is a timing chart for explaining the processing of authentication in the database retrieval system in FIG. 3.

Fundamentally, this is similar to that in the first embodiment, and in FIG. 4 where the same symbols are assigned to the parts corresponding to those in FIG. 2, first, a case that a user accesses information in the local database 5C, which has high confidentiality, with the database retrieval S/W 5E that is an application operating in the user terminal 5 will be described. The database retrieval S/W 5E that is an application performing access control of the information having high confidentiality is required to perform the user authentication so as to judge whether the user has access authorization (SP5).

The authentication information acquisition S/W 5B in the user terminal 5 acquires the finger print information, which is necessary for the authentication, from the finger print information acquisition apparatus 7 (SP6). At this time, this S/W 5B may cooperate with other S/W (software such as a driver acquiring the authentication information).

The authentication information acquisition unit 7A in the finger print acquisition apparatus, which is instructed to acquire the finger print information from the authentication information acquisition S/W 5B in the user terminal 5 acquires the finger print information from the user (SP1). Although encryption processing unit 7B encrypts this finger print information since this finger print information is user's personal information, first, the encryption processing unit 7B creates a common key in the common key encryption method for encrypting this finger print information, and encrypts the finger print information with this common key. At the same time, the encryption processing unit 7B acquires date and time information, creates a message digest with connecting the date and time information with the common key, and further encrypts the message digest with the common key (SP2).

The public key acquisition unit 7C in the finger print acquisition apparatus 7 acquires the public key of the authentication server 3 from user's instruction such as a floppy disk, a magnetic card, an IC card, or key entry. Alternatively, if the finger print acquisition apparatus 7 is properly administrated, the public key of the authentication server 3 is fixedly saved in the public key acquisition unit 7C in the finger print acquisition apparatus 7, and hence the user may use the public key after recognizing the public key. Next, the encryption processing unit 7B encrypts the common key with the public key of the authentication server 3 (SP3). Then, the finger print acquisition unit 7A transfers the finger print information encrypted, the date and time information, the message digest with connecting the date and time information with the common key that is encrypted, and the encrypted common key as the authentication information to the authentication information acquisition S/W 5B in the user terminal 5 (SP4).

The authentication information acquisition S/W 5B in the user terminal 5 acquires a user ID such as a user name and a mail and adds them to the authentication information (SP7).

The authentication request unit 5D transfers this authentication information to the authentication controller 3A in the authentication server 3 (SP7).

The authentication controller 3A in the authentication server 3 makes the encryption processing unit 3C decode the authentication information transferred, and performs the user authentication. At this time, the encryption processing unit 3C compares the message digest created from the date and time information and common key, which is transferred, in the authentication server 3 with the message digest decoded from the message digest obtained by connecting the date and time information, which is encrypted, with the common key, and confirms the validity of the date and time, when the authentication information was created, in consideration of transfer delay (SP12).

The authentication controller 3A performs finger print matching from the finger print information and user ID, which are included in the authentication information transferred, and personal information originally saved in the authentication information database 3B in the authentication server 3. The authentication controller 3A creates the result of the authentication showing that the user is valid if the authentication controller 3A identifies the user as the principal in consequence of matching, or judges that the user is not the principal if the authentication controller 3A cannot identify the user as the principal in consequence of the matching, and creates the result of the authentication. This result of the authentication is delivered to the encryption processing unit 3C, and the encryption processing unit 3C creates a message digest of the result of the authentication, encrypts the message digest with the secret key of the authentication server 3, that is, performs digital signature, and delivers this message digest, which is encrypted, to the authentication controller 3A. The authentication controller 3A informs the authentication request unit 5D in the user terminal 5 of the result of the authentication with including the message digest, which is encrypted, in the result of the authentication (SP13).

The authentication request unit 5D in the user terminal 5 that receiving the result of the authentication informs the encryption processing unit 5F of the result of the authentication. The encryption processing unit 5F decodes the informed message digest, which is encrypted, with the public key of the authentication server 3, and confirms that the message digest is surely the valid message from the authentication server 3 by comparing the decoded message digest with the message digest of the informed result of the authentication (SP10). If the authentication request unit 5D receives from the encryption processing unit 5D the result of confirmation that the information is the valid information from the authentication server 3, the authentication request unit 5D informs the database retrieval S/W 5E of the result of the authentication. The database retrieval S/W 5E judges approval or disapproval of access to the information in the local database 5C, which has high confidentiality, to the user according to the result of the authentication. For example, the database retrieval S/W 5E performs operation to the user access such as the display of the confidential information (SP11).

According to this configuration, when the user terminal 5 requests the authentication server 3 to perform the personal authentication, it is possible to obtain the same effects as those in the first embodiment.

Although the present invention is applied in the database retrieval system 1 in this embodiment, the same effects can be obtained even if the database retrieval S/W is an application, constructing another system, such as accounting information administration S/W.

Embodiment 3

This third embodiment is an embodiment where the encryption processing unit 7B and public key acquisition unit 7C in the finger print acquisition apparatus 7 that is a biometrics acquisition apparatus 6 in the first embodiment present in the user terminal 5.

Figure 5:
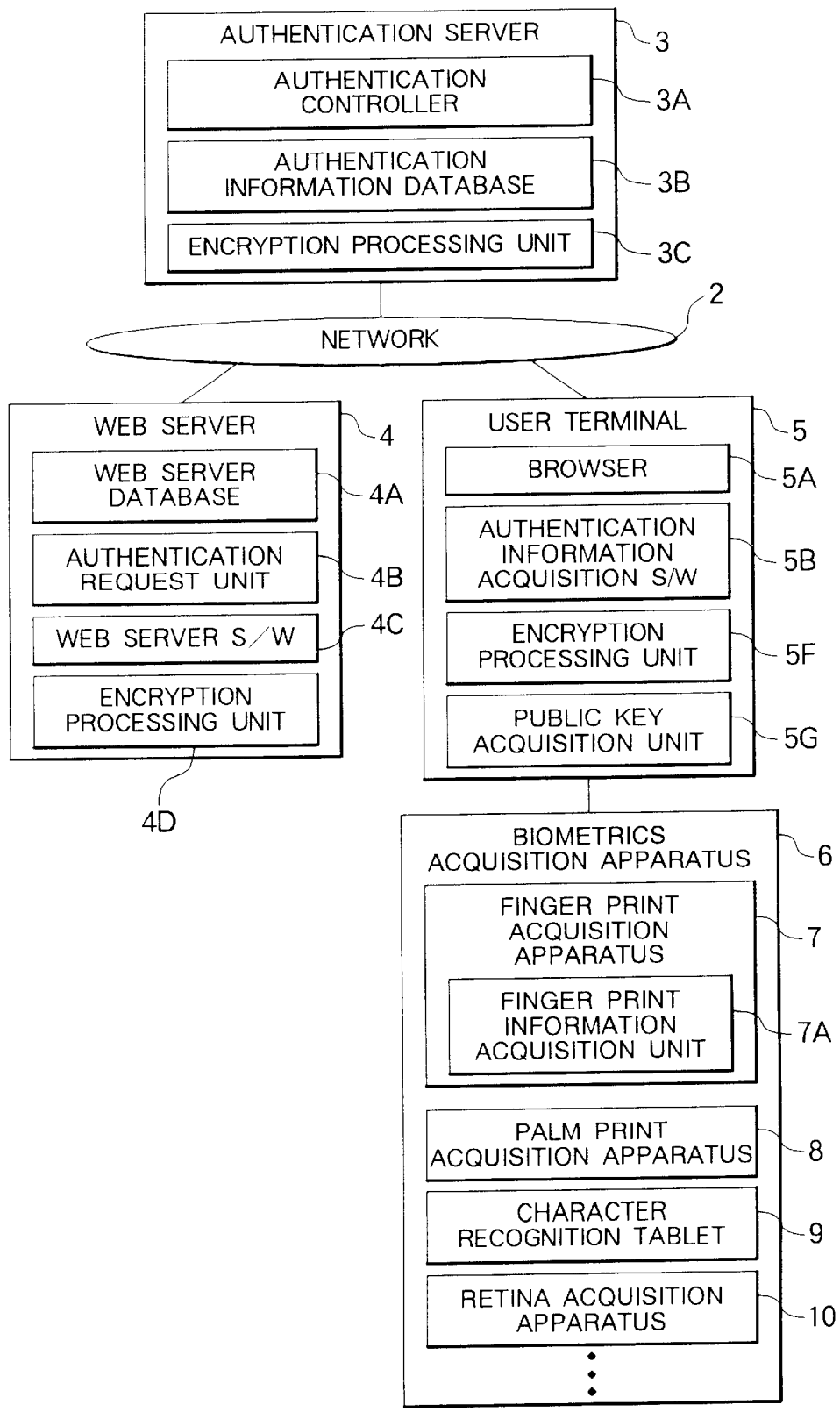
FIG. 5 is a block diagram showing the configuration of a third embodiment of an Web system where a remote authentication system according to the present invention is applied.

In FIG. 5 where the same symbols are assigned to the parts corresponding to those in FIG. 1, the user terminal 5 is a computer system such as a personal computer and a workstation, where a browser 5A displaying the information of the Web server terminal 4, an encryption processing unit 5F encrypting the finger print information, a public key acquisition unit 5G acquiring the public key of the authentication server 3, and an authentication information acquisition S/W 5B operate. In addition, a biometrics acquisition apparatus 6 is connected to the user terminal 5. Furthermore, the authentication server 3 and Web server 4 have the same configuration as that in the first embodiment.

In addition, the biometrics information which the biometrics acquisition apparatus 6 in this embodiment acquires can be image data, image data that is not processed such as electrostatic data, and also characteristic point data obtained by extracting characteristics from image data. The biometrics acquisition apparatus 6 can be a simple device that only acquires image data and does not have a CPU. Here, a case that the finger print acquisition apparatus 7 is used as the biometrics acquisition apparatus 6 will be exemplified.

The finger print acquisition apparatus 7 is composed of a finger print information acquisition unit 7A that acquires the finger print information by performing image processing and the like and transfers the finger print information to the user terminal.

Next, operation will be described.

Figure 6:
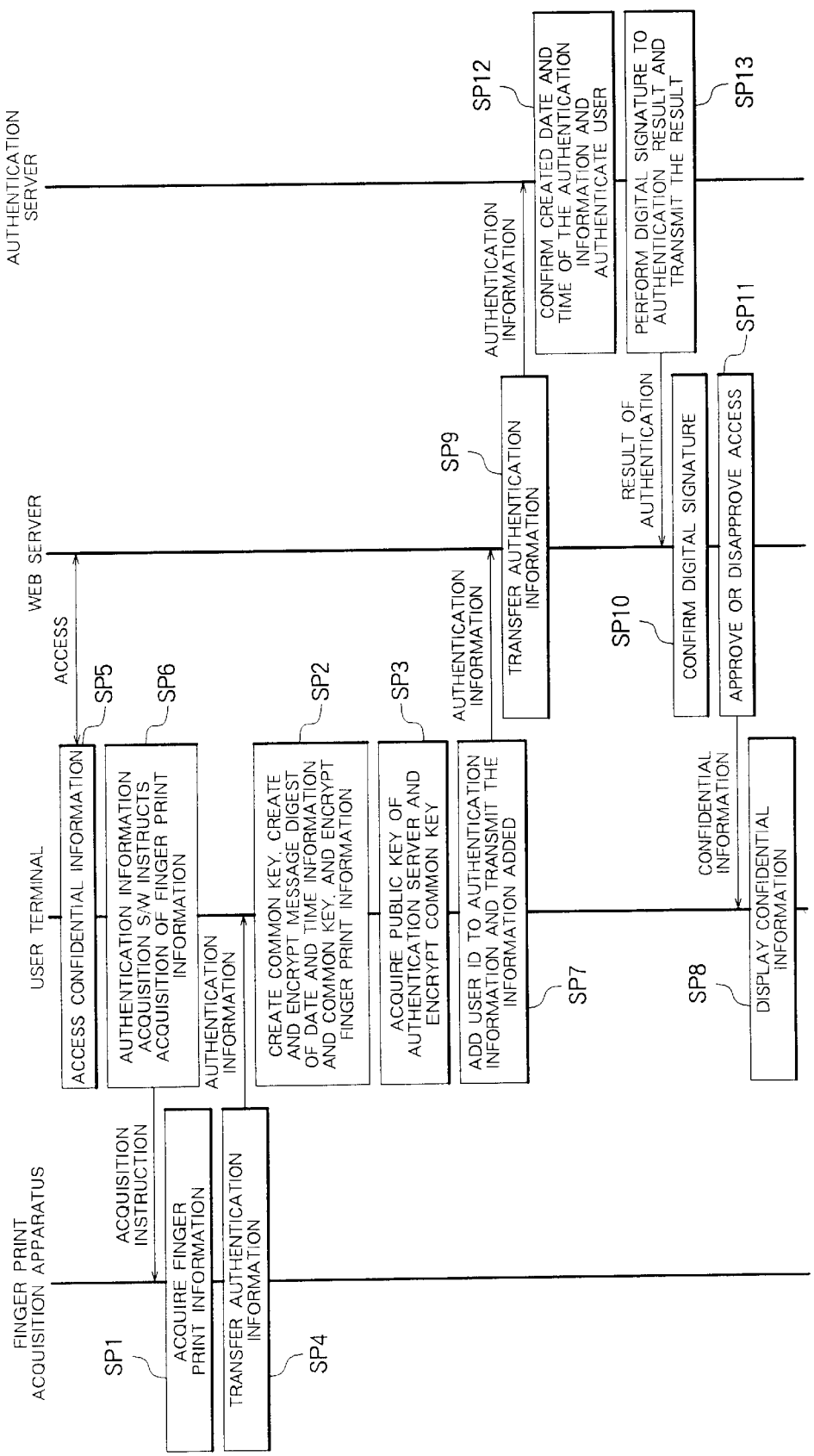
FIG. 6 is a timing chart for explaining the processing of authentication in the Web system in FIG. 5.

Fundamentally, the operation is the same as that in the first embodiment, in FIG. 6 where the same symbols are assigned to the parts corresponding to those in FIG. 2, first, a case that a user accesses the information in the Web server database 4A, which has high confidentiality, in the Web server 4 with the browser 5A that is an application operating in the user terminal 5 will be described (SP5). The Web server S/W 4C, which is an application performing access control of the information having high confidentiality, is required to perform the user authentication so as to judge whether the user has an access authority.

The authentication information acquisition S/W 5B in the user terminal 5 acquires the finger print information, which is biometrics information necessary for the authentication, from the finger print acquisition apparatus 7 (SP6). At this time, the S/W 4C may operate with cooperating with other S/W (software such as a driver acquiring the authentication information).

The finger print information acquisition unit 7A in the finger print acquisition apparatus 7 which is instructed to acquire the finger print information by the authentication information acquisition S/W 5B in the user terminal 5 acquires the finger print information from the user (SP1), and transfers the finger print information to the authentication information acquisition S/W 5B in the user terminal 5 (Sp4).

The authentication information acquisition S/W 5B in the user terminal 5 makes the encryption processing unit 5F encrypt this finger print information since this finger print information is user's inherent personal information. First, the encryption processing unit 5F creates a common key in the common key method for encrypting this finger print information, and encrypts the finger print information with this common key. At the same time, the encryption processing unit 5F acquires date and time information, creates a message digest with connecting the date and time information with the common key, and further encrypts the message digest with the common key (SP2).

The public key acquisition unit 5G in the user terminal 5 acquires a public key of the authentication server from user's instruction such as a floppy disk, a magnetic card, an IC card, or key entry.

Next, the encryption processing unit 5F encrypts the common key with the public key of the authentication server 3 (SP3). Then, the authentication information acquisition S/W 5B transfers the finger print information encrypted, the date and time information, the message digest with connecting the date and time information with the common key that is encrypted, and the encrypted common key, the acquired authentication information as the authentication information to the Web server 4 through the browser 5A. At this time, the browser 5A transfers the authentication information with adding a user ID such as a user name and a mail address, which the browser 5A acquires separately, to the authentication information (SP7).

The authentication request unit 4B in the Web server 4 transfers the authentication information, which the authentication request unit 4B acquires, to the authentication controller 3A in the authentication server 3 through the Web server S/W 4C (SP9).

The authentication controller 3A in the authentication server 3 makes the encryption processing unit 3C decode the authentication information transferred, and performs the user authentication. At this time, the encryption processing unit 3C compares the message digest created from the date and time information and common key, which are transferred, in the authentication server 3 with the message digest decoded from the message digest obtained by connecting the date and time information, which is encrypted, with the common key, and confirms the validity of the date and time, when the authentication information was created, in consideration of transfer delay (SP12).

The authentication controller 3A performs finger print matching from the finger print information and user ID, which are included in the authentication information transferred, and personal information originally saved in the authentication information database 3B in the authentication server 3. The authentication controller 3A creates the result of the authentication showing that the user is valid if the authentication controller 3A identifies the user as the principal in consequence of matching, or judges that the user is not the principal if the authentication controller 3A cannot identify the user as the principal in consequence of the matching, and creates the result of the authentication. The result of this authentication is delivered to the encryption processing unit 3C, and the encryption processing unit 3C creates a message digest of the result of the authentication, encrypts the message digest with the secret key of the authentication server 3, that is, performs digital signature, and delivers this message digest, which is encrypted, to the authentication controller 3A. The authentication controller 3A informs the authentication request unit 4B in the Web server 4 of the result of the authentication with including the message digest, which is encrypted, in the result of the authentication (SP13).

The authentication request unit 4B in the Web server 4 receiving the result of the authentication informs the encryption processing unit 4D of the result of the authentication. The encryption processing unit 4D decodes the informed message digest, which is encrypted, with the public key of the authentication server 3, and confirms that the message digest is surely the valid message from the authentication server 3 by comparing the decoded message digest with the message digest of the informed result of the authentication (SP10). If the authentication request unit 4B is informed from the encryption processing unit 5D that it was confirmed that the information was the valid information from the authentication server 3, the authentication request unit 4B informs the Web server S/W 4C of the result of the authentication. The Web server S/W 4C judges approval or disapproval of access to the information in the Web server database 4A, which has high confidentiality, to the user according to the result of the authentication. For example, the Web server S/W 4C performs operation to the user access such as the display of the confidential information (SP11).

In this manner, the finger print information that is user's personal information is encrypted with the common key created, the common key is encrypted with the public key of the authentication server 3, which the user set, and the public key of the authentication server 3 is directly set by the user in the user terminal 5. Hence, there is such an effect that it is possible to securely protect the user's personal privacy, which is the finger print information that is the biometrics information, in a style of reflecting user's intention since the finger print information is transferred over the network in such a condition that only the authentication server 3, which the user assigned, can decode the finger print information. Nevertheless, although security becomes low in comparison with a case that the finger print information is encrypted from the finger print acquisition apparatus 7 since there arises a period, when the finger print information exists in the user terminal 5 without being encrypted, there is no problem if the user terminal 5 itself is properly administrated, and there is an effect that the configuration of the finger print acquisition apparatus 7 becomes simple since the encryption processing unit and public key acquisition unit are unnecessary in the finger print acquisition apparatus 7. As effects except the above-described effects, the similar effects as those in the first embodiment can be obtained. In addition, this embodiment can be applied also to the application such as the database retrieval S/W 5E, which are shown in the second embodiment, and hence it is possible to obtain the same effects.

Furthermore, in all of the first, second, and third embodiments, a common key for encrypting the user's biometrics information obtained is created. Nevertheless, it is necessary to eliminate the tendency of the random numbers for creating the common key so as to make it difficult to break the common key. Since the biometrics information generally has values different every acquisition, the message digest of the biometrics information acquired is used as a part or all of the random numbers.

As described above, it is simply performed to eliminate the tendency of the generated random numbers since the random numbers generated from the message digest of the biometrics information acquired are generated. Furthermore, since a part or all of this random numbers are used as the random numbers for generating the common key, it is possible to generate the random numbers irrelevant to the number of authentication times and the time and to construct a system that is strong on security against the decoding of the common key.

Embodiment 4

Although only the valid administrator can perform the administration of the biometrics information acquisition apparatus, it is necessary that the administrator, being not authenticated, or another person acting for the administrator can perform initialization of a biometrics acquisition apparatus if there arises such a state that no one cannot authenticate the valid administrator. This case will be described with exemplifying such a case that, in the finger print acquisition apparatus in the first and second embodiments, the finger print acquisition apparatus is properly administrated and a public key of an authentication server is fixedly determined in the finger print acquisition apparatus.

Figure 7:
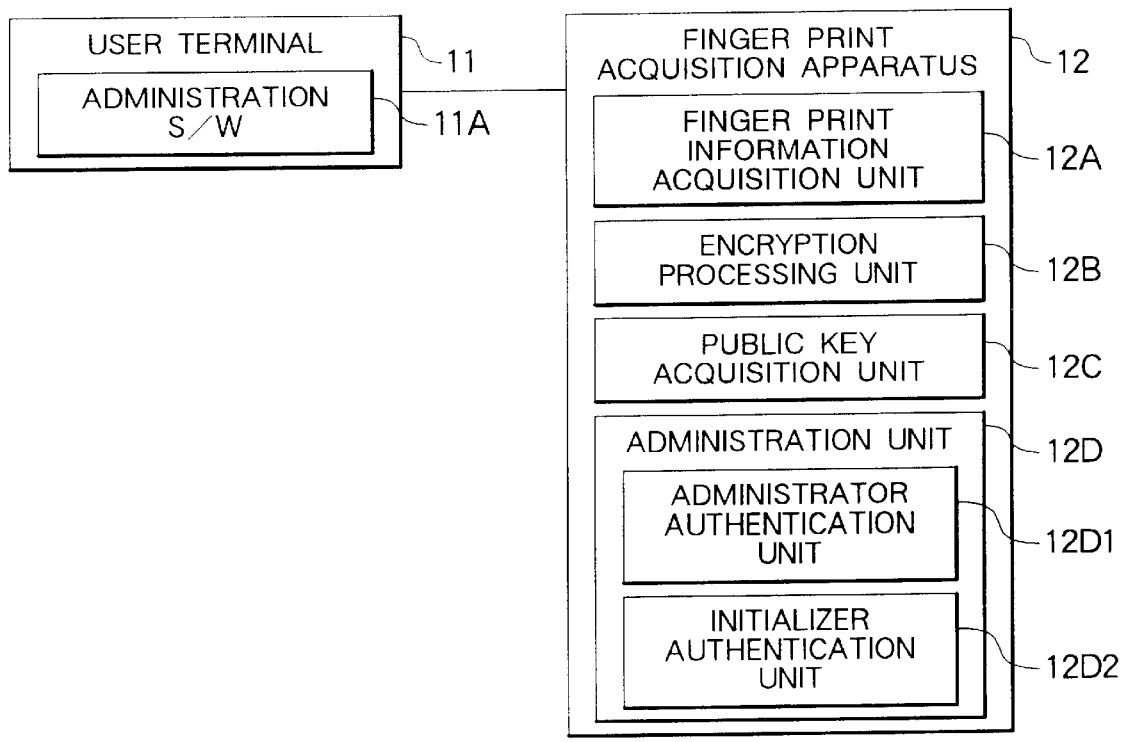
FIG. 7 is a block diagram showing the configuration of a fourth embodiment at the time of administration of a finger print acquisition apparatus where a remote authentication system according to the present invention is applied.

FIG. 7 is the configuration at the time of administrating, that is, setting and changing the public key fixedly saved in a public key acquisition unit 12C in a finger print acquisition apparatus 12. An administration terminal 11 is a computer system such as a personal computer and a workstation, where an administration S/W 11A operates. The finger print acquisition apparatus 12 is composed of a finger print information acquisition unit 12A and an encryption processing unit 12B, a public key acquisition unit 12C, and an administration unit 12D.

The administration S/W 11A in the administration terminal 11 issues authentication request of an administrator to the finger print acquisition apparatus 12 so as to execute setting of the public key. Although an administrator authentication unit 12D1 in an administration unit 12D in the finger print acquisition apparatus 12 acquires administrator's finger print from the finger print information acquisition unit 7A and performs finger print matching of the administrator, the administrator authentication unit 12D1 may become in such a condition that the unit 12D1 cannot identify the administrator as the valid administrator. This corresponds to a case that the finger print itself is lost due to an injury of the administrator. In this case, although the administration S/W 11A instructs an initializer authentication unit 12D2 in the administration unit 12D in the finger print acquisition apparatus 12 to perform initialization, the S/W 11A performs the authentication of the initializer with means, being set beforehand, such as a password. The initializer authentication unit 12D2 performs only the authentication of the initializer, only the initialization of the finger print acquisition apparatus is executed by the authentication of the initializer authentication unit 12D2.

In this manner, by providing the authentication means for an initializer separately from an ordinary administrator, there are such effects that it is possible to perform only the initialization if an administrator cannot be authenticated and suddenly becomes absent, and furthermore to prevent a person not having the initialization authority from invalidly performing the initialization.

Embodiment 5

Figure 8:
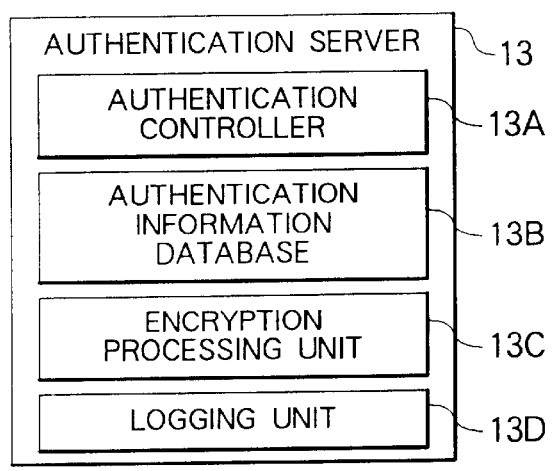
FIG. 8 is a block diagram showing the configuration of a fifth embodiment of an authentication server where a remote authentication system according to the present invention is applied.

FIG. 8 shows an authentication server where means for finding invalid authentication is applied to the above-described authentication server so as to enhance reliability.

An authentication server 13 is a computer system such as a personal computer and a workstation, which is composed of a logging unit 13D, an authentication controller 13A, an encryption processing unit 13C, and an authentication information database 13B.

The logging unit 13D in the authentication server 13 logs a matching rate that is the result of matching biometrics at the time of the user authentication. In addition, the logging unit 13D confirm that a matching rate at this time does not change more than or equal to a preset value determined by the administrator by comparing the matching rate at this time with the average matching rate at the time of identifying a user as the principal until the previous occasion if the authentication controller 13A does not identifies the user as the principal at the time of the user authentication. If the matching rate changes more than or equal to a fixed value, the logging unit 13D increases the number of failure times. If the number of failure times reaches the value more than or equal to a fixed value determined by the administrator, the logging unit 13D informs the administrator, who is registered beforehand, and the user herself/himself of the failure.

Since this structure informs the administrator and the user, who is personated, of the abnormal result of the matching that is unique in biometrics authentication, it is possible to early find the invalid authentication and to keep the high security of the system.

In addition, since biometrics information becomes information different every acquisition even if matching rates are the same, it is stochastically very small that biometrics information acquired in the past coincides with the new biometrics information. An invalidity-finding structure using this characteristic of the biometrics authentication will be described.

The logging unit 13D in the authentication server 13 that is shown in FIG. 8 compares a matching rate at this time with the matching rate at the time of identifying a user as the principal until the previous occasion and confirms that both matching rates are the same if the authentication controller 13A identifies the user as the principal at the time of the user authentication. If the matching rates are the same and a message digest of the biometrics information is not saved, the logging unit 13D informs the authentication controller 13A of making the user authentication unsuccessful, and the authentication controller 13A makes the result of the authentication unsuccessful. At the same time, the logging unit 13D saves the message digest of the biometrics information with the matching rate. If the matching rates are the same and the message digest of the biometrics information is saved, the logging unit 13D calculates a message digest of the biometrics information at this time, compares this message digest with the message digest of the biometrics information at the same matching rate in the past. If both message digest are different from each other, the logging unit 13D identifies the user as the principal, but, if both coincide with each other, the logging unit 13D informs the authentication controller 13A of making the user authentication unsuccessful since there is a possibility of masquerade. The authentication controller 13A makes the result of the authentication unsuccessful. The logging unit 13D increases the number of failure times at the same matching rate if the authentication is made unsuccessful due to coincidence of the matching rate and message digest, and, if this number of failure times reaches a value more than or equal to the fixed value determined by the administrator, the logging unit 13D informs the administrator and the user herself/himself that are registered beforehand.

Since this structure informs the administrator and the user, who is personated, of such an abnormal state that it is considered to be the masquerade caused by leakage of the biometrics information, it is possible to early find the invalid authentication and to keep the high security of the system. In addition, there are such effects that it is possible to reduce a storage area since an object which the logging unit 13D saves is the message digest of the biometrics information at the time of the same matching rate after the second occasion, and that it is possible to shorten the time consumed for comparison in comparison with the comparison, performed by using biometrics information itself, because of the comparison performed by using the message digests.

As described above, according to the present invention, there is such an effect that it is possible to securely protect the user's personal privacy, which is the finger print information that is the biometrics information, in a style of reflecting user's intention since the finger print information is transferred over the network in such a condition that only the authentication server, which the user assigned, can decode the finger print information, and it is possible to prevent invalid authentication information from being reused since the date and time when the authentication information was created can be confirmed in the authentication server 3, and to keep the security of the system high since the authentication request side can confirm whether the user is authenticated by the authentication server.

Furthermore, although a user can instruct a public key of the authentication server, there is no problem on security even if the floppy disk, magnetic card, or IC card, which saves this public key, is lost or stolen, and the user can receive the personal authentication with a substitute, which saves the same public key or the same article. There is another effect that it is unnecessary to perform processing such as special notification and reissue at the time of loss and burglar and it is possible to lighten the administration load.

In addition, since the present invention creates random numbers, used for creating the common key, from the biometrics information acquired, it is possible to generate the random numbers irrelevant to the number of authentication times and the time, and to construct a system that is strong on security against the decoding of the common key.

Furthermore, by providing the authentication means for an initializer separately from an ordinary administrator, there are such effects that it is possible to perform the initialization even if an administrator suddenly becomes absent, and furthermore to prevent a person not having the initialization authority from invalidly performing the initialization.

Moreover, since the authentication server logs at the time of the user authentication and informs a person, who is registered beforehand, of the abnormal result of the matching that is unique in biometrics authentication, it is possible to early find the invalid authentication and to keep the high security of the system.

What is claimed is:

1. A remote authentication system in which an authentication server, an application server, and a user terminal are connected to a network and authenticates a user using the user terminal, wherein the authentication server includes a public key and a secret key each encrypted using a public key encryption method, in which the public key is announced, and the secret key is concealed;

wherein at least one biometrics acquisition apparatus is connected to the user terminal;

wherein the biometrics acquisition apparatus: encrypts user's biometrics information, acquired at the time of authentication, with a common key in a common key encryption method; acquires date and time information, creates a message digest by connecting the date and time information with the common key, and further encrypts the message digest with the common key; acquires the public key of the authentication server, which the user assigns, and encrypts the common key with the public key of the authentication server; and transfers the encrypted biometrics information, the encrypted common key and date and time information, and the encrypted message digest, as authentication information to the user terminal;

wherein the user terminal and the application server transfer the authentication information to the authentication server; and wherein the authentication server: decodes user's biometrics information with the common key acquired by decoding the authentication information, using the secret key; authenticates the user with the biometrics information; creates and encrypts the result of the authentication and a message digest of the result of the authentication; and transfers the result of the authentication and the message digest of the result to the application server.

2. A remote authentication system in which an authentication server, an application server, and a user terminal are connected to a network and authenticates a user using the user terminal, wherein the authentication server includes a public key and a secret key each encrypted using a public key encryption method, in which the public key is announced, and the secret key is concealed, and at least one biometrics acquisition apparatus is connected to the user terminal;

wherein the biometrics acquisition apparatus: encrypts user's biometrics information, acquired at the time of authentication, with a common key in a common key encryption method; acquires date and time information, creates a message digest by connecting the date and time information with the common key, further encrypts the message digest with the common key; acquires the public key of the authentication server, which the user assigns; encrypts the common key with the public key of the authentication server; and transfers the encrypted biometrics information, the encrypted common key and date and time information, and the encrypted message digest, as authentication information to the user terminal;

wherein the user terminal transfers the authentication information to the authentication server; and wherein the authentication server: decodes user's biometrics information with the common key acquired by decoding the authentication information, using the secret key; authenticates the user with the biometrics information; creates and encrypts the result of the authentication and a message digest of the result of the authentication with the secret key; and transfers the result of the authentication and the message digest of the result to the user terminal.

3. The remote authentication system according to claim 1, wherein the biometrics acquisition apparatus transfers biometrics information to the user terminal without encrypting the biometrics information at the time of authentication; and wherein the user terminal: encrypts the user's biometrics information, which is obtained, with a common key in a common key encryption method; acquires a public key of a authentication server that a user assigns; encrypts the common key with the public key of the authentication server; acquires date and time information, creates a message digest by connecting the date and time information with the common key, encrypts the message digest with the common key; and transfers the encrypted biometrics information, the encrypted common key and date and time information, and the encrypted message digest, as authentication information to the user terminal.

4. The remote authentication system according to claim 2, wherein the biometrics acquisition apparatus transfers biometrics information to the user terminal without encrypting the biometrics information at the time of authentication; and wherein the user terminal: encrypts the user's biometrics information, which is obtained, with a common key in a common key encryption method; acquires a public key of a authentication server that a user assigns; encrypts the common key with the public key of the authentication server; acquires data and time information, creates a message digest by connecting the date and time information with the common key, encrypts the message digest with the common key; and transfers the encrypted biometrics information, the encrypted common key and date and time information, and the encrypted message digest, as authentication information to the user terminal.

5. The remote authentication system according to claim 1, wherein the user terminal uses biometrics information as a part or all of random numbers for creating the common key when, at the time of authentication, the user terminal creates the common key in a common key encryption method for encrypting the acquired user's biometrics information.

6. The remote authentication system according to claim 2, wherein the user terminal uses biometrics information as a part or all of random numbers for creating the common key when, at the time of authentication, the user terminal creates the common key in a common key encryption method for encrypting the acquired user's biometrics information.

7. The remote authentication system according to claim 3, wherein the user terminal uses biometrics information as a part or all of random numbers for creating the common key when, at the time of authentication, the user terminal creates the common key in a common key encryption method for encrypting the acquired user's biometrics information.

8. The remote authentication system according to claim 4, wherein the user terminal uses biometrics information as a part or all of random numbers for creating the common key when, at the time of authentication, the user terminal creates the common key in a common key encryption method for encrypting the acquired user's biometrics information.

9. The remote authentication system according to claim 1, wherein the biometrics acquisition apparatus includes an authentication unit for authenticating an administrator who administrates the biometrics acquisition apparatus and an authentication unit of an initializer for authenticating the initialization of the biometrics acquisition apparatus; and wherein the two authentication units perform authentication separately, and performs initialization with authentication of the initializer even if the administrator is not authenticated.

10. The remote authentication system according to claim 2, wherein the biometrics acquisition apparatus includes an authentication unit for authenticating an administrator who administrates the biometrics acquisition apparatus and an authentication unit of an initializer for authenticating the initialization of the biometrics acquisition apparatus; and wherein the two authentication units perform authentication separately, and performs initialization with authentication of the initializer even if the administrator is not authenticated.

11. The remote authentication system according to claim 3, wherein the biometrics acquisition apparatus includes an authentication unit for authenticating an administrator who administrates the biometrics acquisition apparatus and an authentication unit of an initializer for authenticating the initialization of the biometrics acquisition apparatus; and wherein the two authentication units perform authentication separately, and performs initialization with authentication of the initializer even if the administrator is not authenticated.

12. The remote authentication system according to claim 4, wherein the biometrics acquisition apparatus includes an authentication unit for authenticating an administrator who administrates the biometrics acquisition apparatus and an authentication unit of an initializer for authenticating the initialization of the biometrics acquisition apparatus; and wherein the two authentication units perform authentication separately, and performs initialization with authentication of the initializer even if the administrator is not authenticated.

13. The remote authentication system according to claim 1, wherein the authentication server: saves a historic record of a matching rate that is a result of matching biometrics at the time of user authentication; compares a matching rate with an average matching rate at the time of identifying a user as a principal until it is determined by the authentication server at the time of user authentication that the user is not the principal; confirms whether a matching rate at this time is greater than a preset value determined by an administrator; and informs a contact, who is registered beforehand, if a number of failed attempts at authentication, due to the matching rate being greater than a preset value, reaches a fixed value determined by the administrator.

14. The remote authentication system according to claim 2, wherein the authentication server: saves a historic record of matching rate that is a result of matching biometrics at the time of user authentication; compares a matching rate with an average matching rate at the time of identifying a user as a principal until it is determined by the authentication server at the time of user authentication that the user is not the principal; confirms whether a matching rate at this time is greater than a preset value determined by an administrator; and informs a contact, who is registered beforehand, if a number of failed attempts at authentication, due to the matching rate being greater than a preset value, reaches a fixed value determined by the administrator.

15. The remote authentication system according to claim 3, wherein the authentication server: saves a historic record of a matching rate that is a result of matching biometrics at the time of user authentication; compares a matching rate with an average matching rate at the time of identifying a user as a principal until it is determined by the authentication server at the time of user authentication that the user is not the principal; confirms whether a matching rate at this time is greater than a preset value determined by an administrator; and informs a contact, who is registered beforehand, if a number of failed attempts at authentication, due to the matching rate being greater than a preset value, reaches a fixed value determined by the administrator.

16. The remote authentication system according to claim 4, wherein the authentication server: saves a historic record of a matching rate that is a result of matching biometrics at the time of user authentication; compares a matching rate with an average matching rate at the time of identifying a user as a principal until it is determined by the authentication server at the time of user authentication that the user is not the principal; confirms whether a matching rate at this time is greater than a preset value determined by an administrator; and informs a contact, who is registered beforehand, if a number of failed attempts to authentication, due to the matching rate being greater than a preset value, reaches a fixed value determined by the administrator.

17. The remote authentication system according to claim 1, wherein the authentication server: saves historic records of matching rates that are results of matching biometrics at the time of user authentication; compares a matching rate with a matching rate at the time of identifying a user as a principal until at the time of user authentication if the authentication server identifies the user as the principal; makes the user authentication unsuccessful if the two matching rates are the same rates and a message digest of biometrics information is not saved, performs a message digest calculation of biometrics information if the user authentication is unsuccessful, saves the message digest of biometrics information with the matching rate; saves a message digest of biometrics information with a matching rate as a pair by calculating the message digest of biometrics information at this time if the two matching rates are the same and a message digest is saved, compares the message digest of biometrics information at this time with the message digest of biometrics information at the same matching rate previously obtained, identifies the user as a principal if both message digests are different from each other; does not identify the user as a principal if a pair of a matching rate and a message digest at this time completely coincides with a pair of a matching rate and a message digest previously obtained; and informs a contact, who is registered beforehand, if a number of instances in which the pair of the matching rate and message digest at this time coincides with the pair of the matching rate and message digest previously obtained reaches a value equal to or more than a fixed value which is determined by an administrator.

18. The remote authentication system according to claim 2, wherein the authentication server: saves historic records of matching rates that are results of matching biometrics at the time of user authentication; compares a matching rate with a matching rate at the time of identifying a user as a principal until at the time of user authentication if the authentication server identifies the user as the principal; makes the user authentication unsuccessful if the two matching rates are the same rates and a message digest of biometrics information is not saved, performs a message digest calculation of biometrics information if the user authentication is unsuccessful, saves the message digest of biometrics information with the matching rate; saves a message digest of biometrics information with a matching rate as a pair by calculating the message digest of biometrics information at this time if the two matching rates are the same and a message digest is saved, compares the message digest of biometrics information at this time with the message digest of biometrics information at the same matching rate previously obtained, identifies the user as a principal if both message digests are different from each other; does not identify the user as a principal if a pair of a matching rate and a message digest at this time completely coincides with a pair of a matching rate and a message digest previously obtained; and informs a contact, who is registered beforehand, if a number of instances in which the pair of the matching rate and message digest at this time coincides with the pair of the matching rate and message digest previously obtained reaches a value equal to or more than a fixed value which is determined by an administrator.

19. The remote authentication system according to claim 3, wherein the authentication server: saves historic records of matching rates that are results of matching biometrics at the time of user authentication; compares a matching rate with a matching rate at the time of identifying a user as a principal until at the time of user authentication if the authentication server identifies the user as the principal; makes the user authentication unsuccessful if the two matching rates are the same rates and a message digest of biometrics information is not saved, performs a message digest calculation of biometrics information if the user authentication is unsuccessful, saves the message digest of biometrics information with the matching rate; saves a message digest of biometrics information with a matching rate as a pair by calculating the message digest of biometrics information at this time if the two matching rates are the same and a message digest is saved, compares the message digest of biometrics information at this time with the message digest of biometrics information at the same matching rate previously obtained, identifies the user as a principal if both message digests are different from each other; does not identify the user as a principal if a pair of a matching rate and a message digest at this time completely coincides with a pair of a matching rate and a message digest previously obtained; and informs a contact, who is registered beforehand, if a number of instances in which the pair of the matching rate and message digest at this time coincides with the pair of the matching rate and message digest previously obtained reaches a value equal to or more than a fixed value which is determined by an administrator.

20. The remote authentication system according to claim 4, wherein the authentication server: saves historic records of matching rates that are results of matching biometrics at the time of user authentication; compares a matching rate with a matching rate at the time of identifying a user as a principal until at the time of user authentication if the authentication server identifies the user as the principal; makes the user authentication unsuccessful if the two matching rates are the same rates and a message digest of biometrics information is not saved, performs a message digest calculation of biometrics information if the user authentication is unsuccessful, saves the message digest of biometrics information with the matching rate; saves a message digest of biometrics information with a matching rate as a pair by calculating the message digest of biometrics information at this time if the two matching rates are the same and a message digest is saved, compares the message digest of biometrics information at this time with the message digest of biometrics information at the same matching rate previously obtained, identifies the user as a principal if both message digests are different from each other; does not identify the user as a principal if a pair of a matching rate and a message digest at this time completely coincides with a pair of a matching rate and a message digest previously obtained; and informs a contact, who is registered beforehand, if a number of instances in which the pair of the matching rate and message digest at this time coincides with the pair of the matching rate and message digest previously obtained reaches a value equal to or more than a fixed value which is determined by an administrator.

* * * * *